Patented Nov. 27, 1951

2,576,483

UNITED STATES PATENT OFFICE 2,576,483

METHOD FOR SOLUBILIZING TITANIFEROUS MATERIALS

Frank J. Schultz, Fords, N. J., assignor to National Lead Company, New York, N. Y., a corporation of New Jersey No Drawing. Application January 14, 1949,
Serial No. 71,043

6 Claims. (Cl. 23—87)

The present invention relates to the preparation of halide solutions of titanium; more particularly to titanium solutions in which the solvent is predominantly hydrochloric acid, hereinafter sometimes referred to as "titanium chloride solutions."

An efficient, economical and rapid means of producing titanium chloride solutions by dissolution of titaniferous materials has long been sought. Previous attempts to so prepare such solutions have not been commercially successful because it was found necessary to maintain the temperature of the attack below about 60° C. in order to prevent hydrolysis and consequent precipitation of the titanium values which occurs at higher temperatures. (The term "titaniferous materials" as used herein is meant to include titaniferous ores, which may contain iron, e. g. ilmenite, titanium-rich concentrates obtained from such ores, titanium-containing slags obtained for instance, from blast furnace operations, and the like.) The present invention provides a simple, efficient and economical means for obtaining titanium chloride solutions from titaniferous materials.

Accordingly, the principal object of the invention is to provide an economical and commercially practicable method for the preparation of titanium chloride solutions. Another object of the invention is to provide a method for the rapid and substantially complete dissolution of the titanium values contained in titaniferous materials. These and other objects of the invention will be apparent from the following description thereof.

In its broadest aspect, the present invention contemplates extracting at elevated temperatures the titanium values from titaniferous materials with strong aqueous hydrochloric acid containing a predetermined small amount of fluoride ions.

The small amount of fluoride ions which, according to the invention, should be present in the strong hydrochloric acid is most conveniently calculated on the basis of the titanium content of the titaniferous material to be extracted, calculated as $TiO_2$. The minimum amount of fluoride ions calculated as HF may be as low as about one part by weight for about 1000 parts by weight of $TiO_2$ in the titaniferous material. A practical maximum limit is about 1 part to about 10 parts $TiO_2$. That is to say, the fluoride ion content of the extraction acid calculated as HF may vary from about 0.1% to about 10% of the titanium content of the titaniferous material, calculated as $TiO_2$ with a preferred range of about 0.4% to about 5%.

The fluoride ions are introduced into the extraction mixture in the form of a fluorine compound which may be completely soluble or only sufficiently soluble to furnish the desired amount of fluoride ions. Hydrofluoric acid, HF, either as gas or aqueous solution is the preferred source of fluoride ions, but fluoride salts such as alkali metal fluorides e. g. lithium, sodium or potassium fluoride, alkaline earth metal fluorides, e. g. calcium, strontium or barium fluoride, including magnesium fluoride, and complex fluorides, e. g. hydrofluorsilicic acids and salts thereof, may also be used, as well as fluoride minerals, such as cryolite and fluorspar. The invention is not limited to the use of any particular fluoride compound, but may be practiced with any fluoride capable of yielding the desired quantity of fluoride ions and the term "fluoride compound" as used in this description and in the appended claims is intended to embrace all such compounds.

The fluorine compound is preferably added to the hydrochloric extraction acid prior to beginning the extraction, but, if desired, may be added wholly or in part after extraction has commenced. If the fluorine compound is added prior to extraction, initial reaction is promoted and the temperature of the reaction mass rises due to exothermic heat.

For the best result, more particularly for obtaining high yields of solubilized titanium, the strength of the extraction acid should be above about 20% HCl. A practical operating concentration is between about 20% and about 40% HCl. The amount of acid employed may vary considerably depending upon the type of titanium solution desired; that is to say, whether it is desired to produce a so-called "basic" solution, i. e. one in which there is present less hydrochloride acid, HCl, than would be required theoretically to form the normal tetrachloride, $TiCl_4$, or a so-called "acid solution" i. e. one in which there is present more hydrochloric acid, HCl, than would be required to form the normal tetrachloride, $TiCl_4$. By controlling the amount of HCl present in the extraction acid, it is possible to obtain titanium solutions varying between 50% "basic" i. e. containing one-half the amount of HCl theoretically required to form $TiCl_4$ and 25% "acid," i. e. containing one and one-fourth the amount of HCl theoretically required to form $TiCl_4$. There should also be present in the extraction acid an aditional amount of HCl sufficient to react with other extractable constituents of the ore, e. g. ferrous and ferric iron, magnesium etc. to form normal chlorides.

When starting the practice of the present invention, it is preferable to mix cold the titaniferous raw material, e. g. ilmenite ore, in comminuted form, with the desired quantity of strong aqueous hydrochloric acid and the fluorine compound in a suitable reaction vessel equipped with a reflux condenser. The temperature at which the extraction may be carried out most efficiently will be above about 60° C. If desired, the temperature may be held constant throughout the extraction, say at about 80° C. to about 90° C. A convenient and preferable method of conducting the heating is to gradually increase the temperature from a point, say 70° C., which is substantially above 60° C. at which it is held initially until extraction is well started, so that as the extraction neutralization reaction proceeds, the temperature rises progressively to the boiling point of the mixture. Depending upon the manner of heating, size of the particles of titaniferous material, strength of extraction acid, etc., the extraction is usually complete in from about two hours to about six hours.

Completeness of extraction will vary depending upon the degree of basicity or acidity of the titanium chloride solution resulting from extraction. Thus at a maximum basicity of about 50%, extraction may be complete when 75% of the $TiO_2$ content of the titaniferous material has been solubilized, whereas at an acidity of 25%, over 99% may be extracted. Operating to obtain solutions having basicities between 15% and 30%, extractions of about 95% of the $TiO_2$ content of the ore are obtainable.

After extraction is complete, the reaction mixture is treated preferably by filtration to separate the titanium chloride solution from the undissolved residues of the titaniferous material and, if present, iron chloride crystals.

Titanium chloride solutions obtained according to the present invention are useful for a variety of purposes. They may be used, for instance, as starting materials in the preparation of titanium salts, titanium metal or titanium pigments. Although they are more stable, more resistant to spontaneous hydrolysis, than pure titanium chloride solutions of corresponding strength and basicity or acidity, they may readily be hydrolyzed by suitable conditioning as, for instance, nucleation and heating and may, therefore, be used for the preparation of titanium dioxide pigment. In copending application, Serial Number 71,044, filed January 14, 1949, by Aagaard and Schultz there is described and claimed a method for the hydrolysis of titanium chloride solutions as obtained from the practice of the present invention. When the titanium chloride solutions of the present invention are to be used for the preparation of titanium dioxide pigments, the extraction of the titaniferous material may be integrated into the process of preparing the pigments in such manner as to constitute a unitary cyclical process. In co-pending application, Serial Number 70,912, now abandoned, filed January 14, 1949, by Schultz, Dahlstrom and Cole, such a process is described and claimed.

One surprising result of the present invention resides in the fact that not only does the presence of fluoride ions in the hydrochloric acid permit the ready extraction of the titaniferous material at elevated temperatures, but they overcome the adverse effect on extraction of commonly occuring impurities in the acid. Thus, even small amounts of sulfuric acid which are generally present in commercial strong hydrochloric acid render such acid unfit for extraction of titanium from titaniferous materials. However, the presence of the fluoride ions in accordance with the present invention overcomes this adverse effect of the sulfuric acid.

The foregoing description has been given for purposes of illustration, but the invention is not to be limited thereto, and various modifications and variations within the scope of the appended claims may be employed.

I claim:

1. Method for preparing chloride solution of titanium from titaniferous material which comprises extracting said material at temperature substantially above 60° C. but not more than 90° C. with strong aqueous hydrochloric acid in the presence of from 0.1% to about 10% of fluoride ions, calculated as HF and based on the weight of $TiO_2$ in said material.

2. Method according to claim 1 in which said titaniferous material is ilmenite.

3. Method according to claim 1 in which said hydrochloric acid is present in strength of at least 20% HCl.

4. Method according to claim 3 wherein the fluoride ions are hydrofluoric acid.

5. Method for preparing chloride solution of titanium from ilmenite ore which comprises adding to aqueous hydrochloric acid having strength of at least 20% HCl an amount of fluoride ions such that the acid will contain from 0.1% to about 10% of fluoride ions calculated as HF and based on $TiO_2$ content of the ilmenite, mixing said acid with comminuted ilmenite in such proportions that there will be present sufficient hydrochloric acid to form chloride solutions of titanium from 50% basic to 25% acid, and in addition to form normal chlorides with other extractable constituents of the ore, heating the mixture to temperatures substantially above 60° C. but not more than 90° C. and continuing the heating until extraction of the titanium values is substantially complete, and thereafter separating the titanium chloride solution from the undissolved residue.

6. Method for preparing chloride solution of the titanium from ilmenite ore which comprises adding to aqueous hydrochloric acid having the strength of at least 20% HCl, an amount of fluoride ions such that the acid will contain from about 0.4% to about 5% of fluoride ions calculated as HF and based on the $TiO_2$ content of the ilmenite, mixing such acid with comminuted ilmenite in such proportions that there will be present sufficient hydrochloric acid to form chloride solution of titanium from 15% to 30% basic and in addition to form normal chlorides with other extractable constituents of the ore, heating the mixture under refluxing conditions to temperatures substantially above 60° C. but not more than 90° C. and continuing the heating until extraction of titanium values is substantially complete, and thereafter separating the titanium chloride solution from the undissolved residue.

FRANK J. SCHULTZ.

REFERENCES CITED

The following references are of record in the file of this patent:

UNITED STATES PATENTS

| Number | Name | Date |
|---|---|---|
| 1,899,573 | Kubelka | Feb. 28, 1933 |
| 1,899,574 | Kubelka | Feb. 28, 1933 |
| 2,042,436 | Svendsen | May 26, 1936 |
| 2,088,913 | Llewellyn | Aug. 3, 1937 |
| 2,183,365 | Booge | Dec. 12, 1939 |
| 2,286,881 | Von Bichawsky | June 16, 1942 |
| 2,288,727 | Mayer | July 7, 1942 |

OTHER REFERENCES

Mellor's: "A Comprehensive Treatise on Inorganic and Theoretical Chemistry," vol. 2, pages 1 and 2, Longmans, Green Co., N. Y., publishers.

J. W. Mellor: "Modern Inorganic Chemistry," single vol. ed., 1935, page 329, Longmans, Green & Co., N. Y.